(12) United States Patent
Fujie et al.

(10) Patent No.: US 10,947,663 B2
(45) Date of Patent: Mar. 16, 2021

(54) SEAM INSPECTION DEVICE

(71) Applicant: JUKI CORPORATION, Tama (JP)

(72) Inventors: Kimiko Fujie, Tama (JP); Koji Hiraoka, Tama (JP)

(73) Assignee: JUKI CORPORATION, Tokyo (JP)

( * ) Notice: Subject to any disclaimer, the term of this patent is extended or adjusted under 35 U.S.C. 154(b) by 78 days.

(21) Appl. No.: 16/353,026

(22) Filed: Mar. 14, 2019

(65) Prior Publication Data

US 2019/0284750 A1    Sep. 19, 2019

(30) Foreign Application Priority Data

Mar. 15, 2018    (JP) .............................. JP2018-048526

(51) Int. Cl.
| | | |
|---|---|---|
| *D06H 3/08* | (2006.01) | |
| *G06T 7/00* | (2017.01) | |
| *G01B 11/28* | (2006.01) | |
| *G01N 21/898* | (2006.01) | |
| *G01N 21/956* | (2006.01) | |
| *G01B 11/02* | (2006.01) | |

(52) U.S. Cl.
CPC ............. *D06H 3/08* (2013.01); *G01B 11/022* (2013.01); *G01B 11/28* (2013.01); *G01N 21/8983* (2013.01); *G01N 21/95607* (2013.01); *G06T 7/0008* (2013.01); *G01N 2021/95615* (2013.01); *G06T 2207/30124* (2013.01)

(58) Field of Classification Search
None
See application file for complete search history.

(56) References Cited

U.S. PATENT DOCUMENTS

2009/0195649 A1*   8/2009   Gylling ................. G06T 7/0004
                                                       348/125
2010/0186646 A1*   7/2010   Stokes .................... D05B 19/12
                                                       112/470.05

FOREIGN PATENT DOCUMENTS

JP            H11-90077 A        4/1999

* cited by examiner

*Primary Examiner* — Leon Flores
(74) *Attorney, Agent, or Firm* — Faegre Drinker Biddle & Reath LLP

(57) ABSTRACT

A seam inspection device includes an imaging device and a processing device. The imaging device shoots a sewing object supported by a throat plate of a sewing machine and having seams formed therein. And the processing device detects an abnormality of the seam based on an image of the sewing object acquired by the imaging device.

7 Claims, 13 Drawing Sheets

SE

SE

SEAM INSPECTION DEVICE

CROSS-REFERENCE TO RELATED APPLICATIONS

The present application claims the benefit of priority of Japanese Patent Application No. 2018-048526, filed on Mar. 15, 2018, the content of which is incorporated herein by reference.

Technical Field

The present invention relates to a seam inspection device.

Background Art

An example of a seam inspection device that inspects seams formed by a sewing machine is disclosed in Japanese Unexamined Patent Application Publication No. 11-090077.

In a sewing factory, clothes are produced by a line production method using a plurality of sewing machines, and seam inspection is performed after the entire sewing process is completed. The clothes of which the abnormality is detected in the seam inspection are discarded. Therefore, in a case where the seam inspection is performed after the entire sewing process is completed, the productivity of the clothes deteriorates. In a case where the seam inspection can be performed in the middle of the sewing process, the sewing can be performed again at the time when the abnormality of the seam is detected, and thus it is possible to suppress deterioration of the productivity of the clothes. Such line production and inspection process of the finished product are not limited to the clothes, and also performed in other products accompanying sewing, such as bags, shoes, bedding, furniture, airbags, car seats, and the like, and not being limited to the clothes, there are similar problems in the manufacturing process of all of the sewn materials.

SUMMARY

An aspect of the invention is to suppress deterioration of productivity of a sewn material.

According to an aspect of the present invention, there is provided a seam inspection device comprising:

an imaging device which shoots a sewing object supported by a throat plate of a sewing machine and having seams formed therein; and a processing device which detects an abnormality of the seam based on an image of the sewing object acquired by the imaging device.

According to the aspect of the present invention, it is possible to suppress deterioration of productivity of a sewn material.

DETAILED DESCRIPTION

Hereinafter, embodiments according to the invention will be described with reference to the drawings, but the invention is not limited thereto. Configuration elements of the embodiments which will be described hereinafter can be appropriately combined with each other. In addition, there is also a case where some configuration elements are not used.

Sewing Machine

A sewing machine 1 according to the embodiment will be described. In the embodiment, a positional relationship of each part will be described based on a local coordinate system defined in the sewing machine 1. The local coordinate system is defined by an XYZ orthogonal coordinate system. A direction parallel to an X axis within a predetermined plane is defined as an X-axis direction. A direction parallel to a Y axis within the predetermined plane orthogonal to the X axis is defined as a Y-axis direction. A direction parallel to a Z axis orthogonal to the predetermined plane is defined as a Z-axis direction. In addition, in the embodiment, a plane including the X axis and the Y axis is appropriately referred to as an XY plane. A plane including the X axis and the Z axis is appropriately referred to as an XZ plane. A plane including the Y axis and the Z axis is appropriately referred to as an YZ plane. The XY plane is parallel to a predetermined plane. The XY plane, the XZ plane, and the YZ plane are orthogonal to each other. In addition, in the embodiment, the XY plane and a horizontal plane are parallel to each other. The Z-axis direction is an upward-downward direction. A +Z direction is an upward direction and a −Z direction is a downward direction. In addition, the XY plane may be inclined with respect to the horizontal plane.

Figure 1:
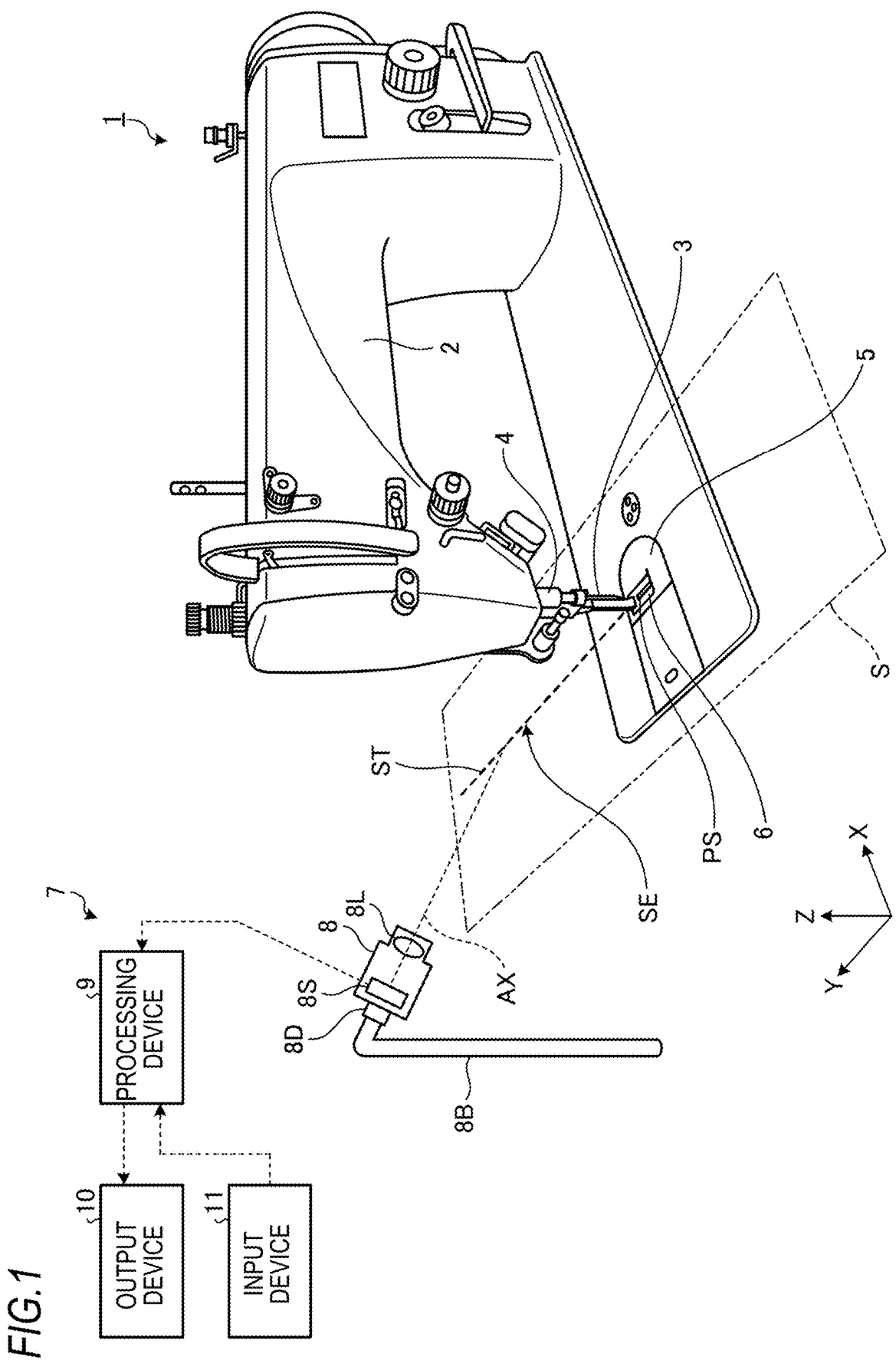
FIG. 1 is a perspective view schematically illustrating an example of a sewing machine according to an embodiment.

FIG. 1 is a perspective view schematically illustrating an example of the sewing machine 1 according to the embodiment. As illustrated in FIG. 1, the sewing machine 1 includes a sewing machine head 2, a needle bar 4 that holds a sewing machine needle 3 and reciprocates in the Z-axis direction, a throat plate 5 that supports a sewing object S, a pressing member 6 that presses the sewing object S, and a seam inspection device 7 that inspects seams SE formed on the sewing object S.

The sewing machine head 2 supports the needle bar 4 such that the needle bar 4 can reciprocate in the Z-axis direction. The needle bar 4 is disposed above the throat plate 5 and can oppose a surface of the sewing object S. A sewing thread ST (upper thread) is hooked on the sewing machine needle 3.

The throat plate 5 supports a rear surface of the sewing object S. An upper surface of the throat plate 5 is parallel to the XY plane. The throat plate 5 supports the sewing object S from below. A shuttle (not illustrated) is disposed below the throat plate 5. A bobbin input into a bobbin case is accommodated in the shuttle. The shuttle rotates in synchronization with the reciprocation of the needle bar 4. The sewing thread ST (lower thread) is supplied from the shuttle.

The pressing member 6 presses the sewing object S from above. The pressing member 6 is supported by the sewing machine head 2. The pressing member 6 is disposed above the throat plate 5 and comes into contact with the surface of the sewing object S. The pressing member 6 holds the sewing object S with the throat plate 5.

When the needle bar 4 is lowered, the sewing machine needle 3 held by the needle bar 4 penetrates the sewing object S and passes through a hole provided on the throat plate 5. When the sewing machine needle 3 passes through the hole of the throat plate 5, the lower thread supplied from the shuttle is hooked on the upper thread hooked on the sewing machine needle 3. In a state where the lower thread is hooked on the upper thread, the sewing machine needle 3 is raised and leaves the sewing object S. When the sewing machine needle 3 penetrates the sewing object S, the sewing machine 1 stops the sewing object S. When the sewing machine needle 3 has left the sewing object S, the sewing machine 1 moves the sewing object S in the +Y direction. The sewing machine 1 reciprocates the sewing machine needle 3 while repeatedly moving and stopping the sewing object S in the +Y direction and forms the seams SE in the sewing object S. The seams SE formed in the sewing object S extend in the Y-axis direction.

In the following description, the position immediately below the sewing machine needle 3 is referred to as a sewing position PS as appropriate. In the XY plane, the sewing position PS matches the position of the sewing machine needle 3. At the sewing position PS, the sewing machine needle 3 penetrates the sewing object S.

Seam Inspection Device

The seam inspection device 7 inspects the seams SE formed in the sewing object S in a state where the sewing object S is supported by the throat plate 5. The seam inspection device 7 inspects the seam SE in parallel with the formation of the seam SE by the sewing machine 1. The seam inspection device 7 detects the presence and absence of abnormality of the seams SE formed in the sewing object S. In addition, the seam inspection device 7 detects a pattern of abnormality of the seam SE.

The seam inspection device 7 includes: an imaging device 8 which shoots the sewing object S supported by the throat plate 5 of the sewing machine 1 and having the seams SE formed therein; a processing device 9 which detects the abnormality of the seams SE based on an image of the sewing object S acquired by the imaging device 8; an output device 10 which outputs a detection result of the processing device 9; and an input device 11 which is operated by an operator.

The imaging device 8 is supported by a supporting member 8B. The supporting member 8B is connected to at least a part of the sewing machine 1. The imaging device 8 is disposed further on the +Z side than the throat plate 5. The imaging device 8 shoots the sewing object S from above in a state where the sewing object S is supported by the throat plate 5. An imaging region of the imaging device 8 is defined further on the +Y side than the sewing position PS. The imaging device 8 shoots the sewing object S immediately after the seams SE are formed by the sewing machine 1 while being supported by the throat plate 5. The imaging device 8 shoots the sewing object S from an inclination direction.

The imaging device 8 includes an optical system 8L and an image sensor 8S that receives light through the optical system 8L. The image sensor 8S is a rolling shutter type (line exposure sequential read type) image sensor. The image sensor 8S is, for example, a complementary metal oxide semiconductor (CMOS) image sensor. The imaging device 8 is a rolling shutter camera.

Figure 2:
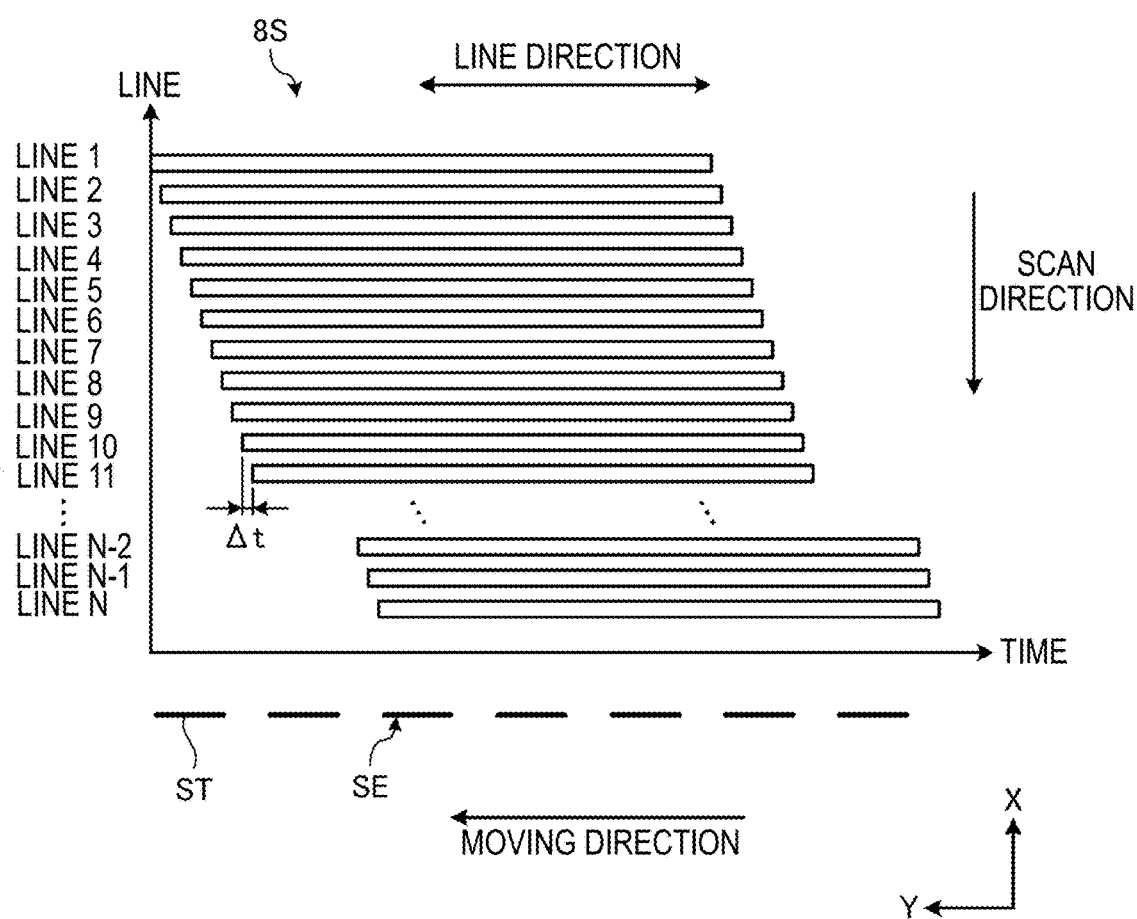
FIG. 2 is a view schematically illustrating an example of an operation of an image sensor according to the embodiment.

FIG. 2 is a view schematically illustrating an example of an operation of the image sensor 8S according to the embodiment. The rolling shutter type image sensor 8S includes a plurality of lines which respectively have a plurality of light receiving elements disposed in a line direction and are disposed in a scan direction orthogonal to the line direction. In the example illustrated in FIG. 2, the lines exist from a line 1 to a line N. The image sensor 8S acquires an image for each line. The light receiving element is, for example, a photodiode. The timing at which acquisition of the image is started (the timing at which the exposure is started) differs from line to line. One image is formed by a combination of images acquired for each line.

The rolling shutter type has an advantage of being inexpensive compared to a global shutter type (simultaneous exposure collective reading type). Meanwhile, a rolling shutter phenomenon occurs in the rolling shutter system in a case of imaging a moving object. The rolling shutter phenomenon is a phenomenon in which distortion occurs in the image of the moving object due to the fact that the timing at which the acquisition of the image is started differs from line to line. When the line direction of the image sensor 8S and a moving direction of a moving object are orthogonal to each other, the rolling shutter phenomenon occurs remarkably. When the line direction of the image sensor 8S and the moving direction of the moving object are parallel to each other, and the occurrence of the rolling shutter phenomenon is suppressed.

The sewing machine 1 moves the sewing object S in the +Y direction which is the moving direction, and forms the seams SE in the sewing object S. As described above, the sewing machine 1 forms the seams SE in the sewing object S while repeatedly moving and stopping the sewing object S. In the formation of the seams SE by the sewing machine 1, the sewing object S and the seams SE formed in the sewing object S move in the Y-axis direction. As illustrated in FIG. 2, the imaging device 8 is installed such that the line direction of the image sensor 8S and the moving direction (Y-axis direction) of the sewing object S are parallel to each other. The moving direction of the sewing object S matches a moving direction of the seams SE and an extending direction of the seams SE. Since the line direction of the image sensor 8S and the moving direction of the seams SE are parallel to each other, the imaging device 8 can acquire the images of the seams SE in which the occurrence of the rolling shutter phenomenon is suppressed.

As illustrated in FIG. 1, a driving device 8D is connected to the imaging device 8. The driving device 8D includes an actuator, such as a motor, and generates power for rotating the imaging device 8 in a rotational direction around an optical axis AX of the optical system 8L. By the driving device 8D, the line direction of the image sensor 8S is adjusted. For example, when the moving direction of the seams SE is inclined with respect to the Y-axis direction, the driving device 8D can adjust the position of the imaging device 8 in the rotational direction around the optical axis AX such that the line direction of the image sensor 8S and the moving direction of the seams SE are parallel to each other. In addition, the driving device 8D can adjust the position of the imaging device 8 in the rotational direction around the optical axis AX such that the line direction of the image sensor 8S and the Y-axis direction are orthogonal to each other.

Figure 3:
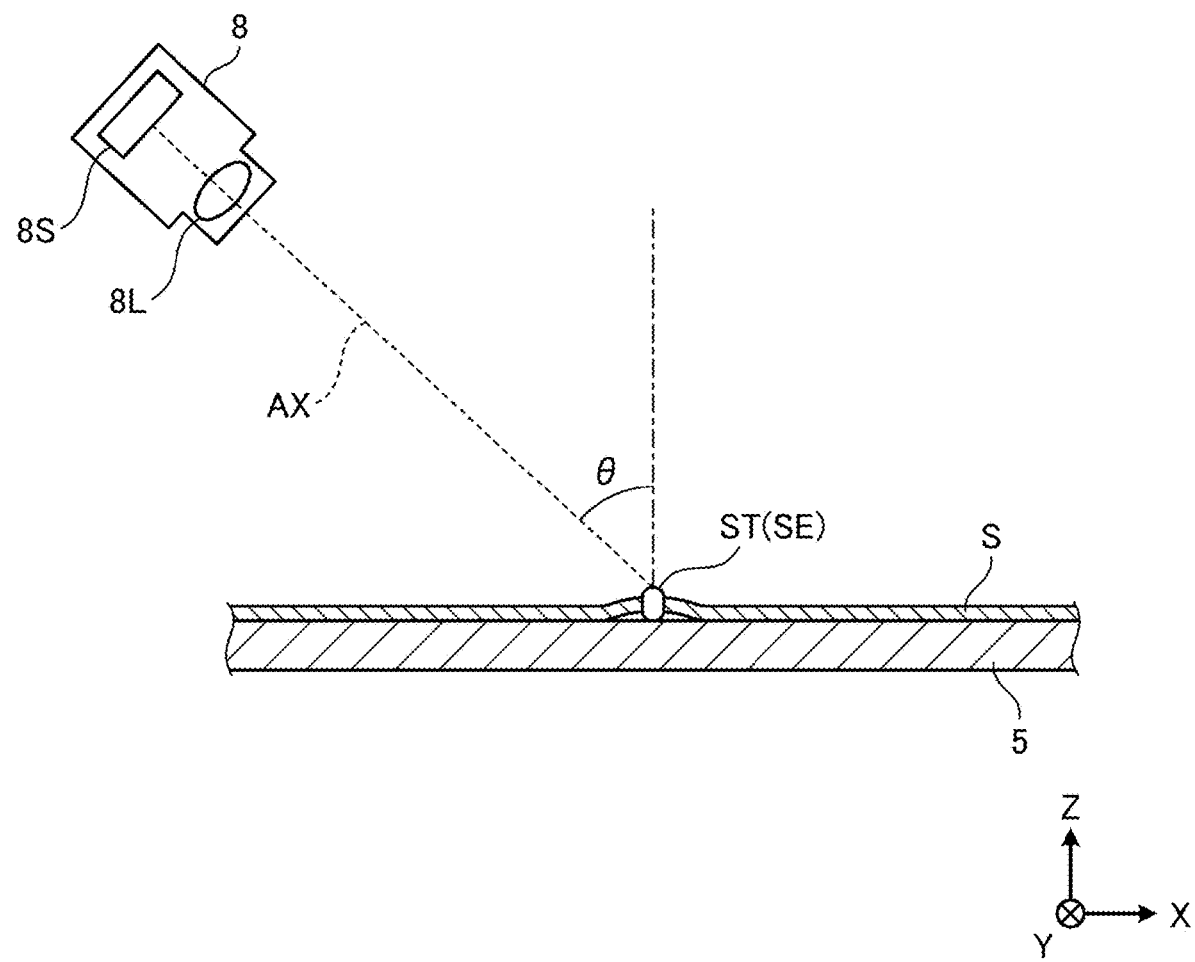
FIG. 3 is a view schematically illustrating a relationship between an imaging device according to the embodiment and a sewing object supported by a throat plate.

FIG. 3 is a view schematically illustrating a relationship between the imaging device 8 according to the embodiment and the sewing object S supported by the throat plate 5.

The imaging device 8 is disposed further on the +Z side than the throat plate 5. An imaging region of the imaging device 8 is defined further on the +Y side than the sewing position PS. The imaging device 8 is installed such that the seams SE are disposed in the imaging region of the imaging device 8. The imaging device 8 is installed such that the optical axis AX of the optical system 8L intersects the seams SE.

The imaging device 8 shoots the sewing object S supported by the throat plate 5 and having the seams SE formed therein, from the inclination direction with respect to a normal line of the upper surface of the throat plate 5. The normal line of the upper surface on the throat plate 5 is parallel to the Z axis. The imaging device 8 is installed such that the angle θ between the optical axis AX of the optical system 8L and the normal line of the upper surface of the throat plate 5 is an acute angle. The angle θ is preferably 20° or more and 70° or less, and more preferably 60°.

As illustrated in FIG. 3, at least a part of the sewing thread ST protrudes from the surface of the sewing object S. As the imaging device 8 shoots the sewing object S from the inclination direction with respect to the normal line of the upper surface of the throat plate 5, the contrast between the sewing object S and the sewing thread ST increases in the image acquired by the imaging device 8. The processing device 9 calculates the position and the shape of the seams SE based on the image acquired by the imaging device 8.

For example, in a case where the imaging device 8 is installed such that the optical axis AX of the optical system 8L and the normal line of the upper surface of the throat plate 5 are parallel to each other, and the imaging device 8 shoots the seams SE from immediately above, there is a possibility that the contrast between the sewing object S and the sewing thread ST decreases in the image acquired by the imaging device 8. As a result, there is a possibility that it becomes difficult for the processing device 9 to calculate the position and the shape of the seams SE based on the image acquired by the imaging device 8. As the imaging device 8 shoots the sewing object S from the inclination direction with respect to the normal line of the upper surface of the throat plate 5, the processing device 9 can calculate the position and the shape of the seams SE based on the image acquired by the imaging device 8 with high accuracy.

The processing device 9 detects the abnormality of the seams SE formed in the sewing object S based on the image of the sewing object S acquired by the imaging device 8.

Figure 4:
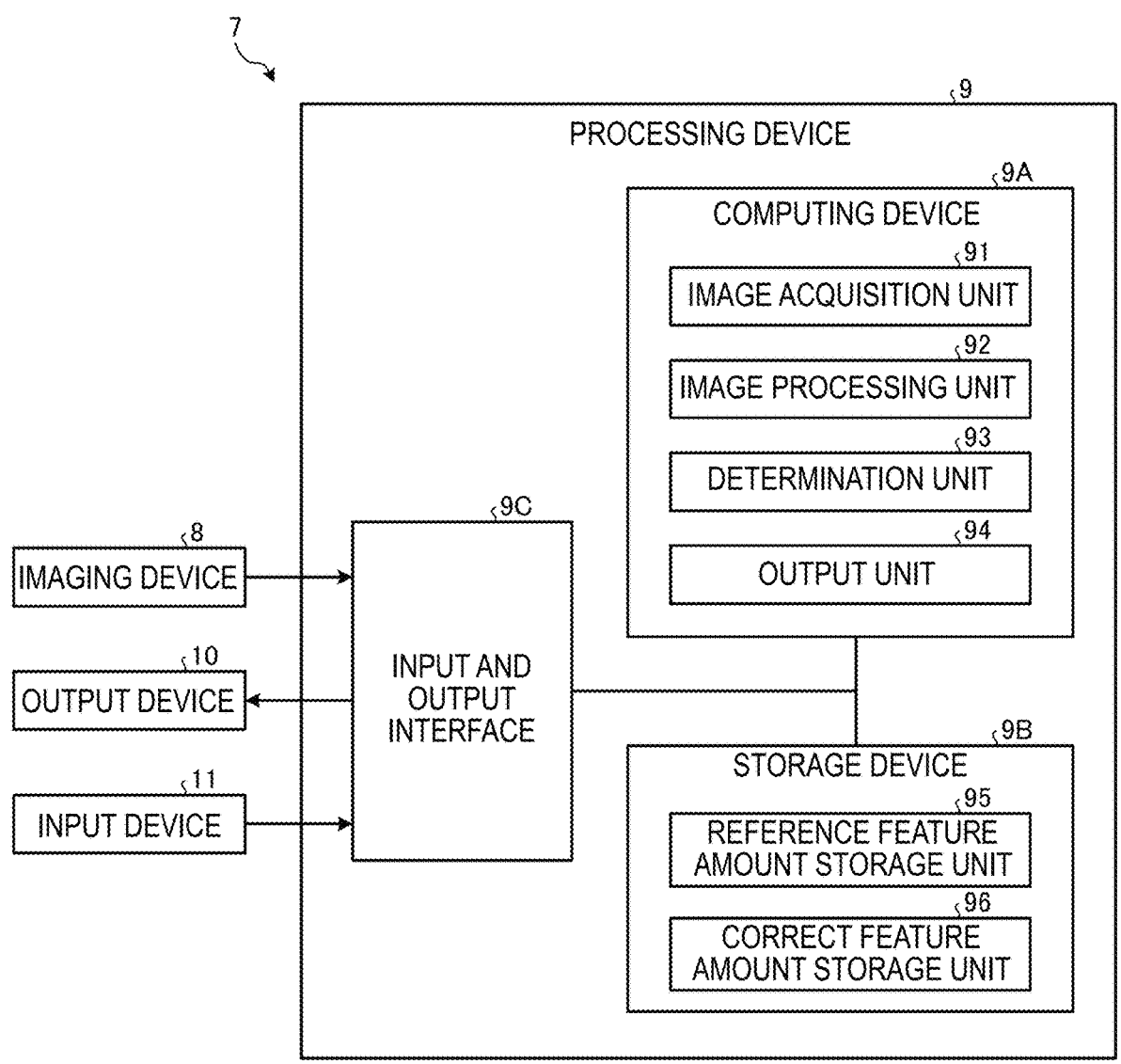
FIG. 4 is a functional block diagram illustrating an example of a processing device according to the embodiment.

FIG. 4 is a functional block diagram illustrating an example of the processing device 9 according to the embodiment. The processing device 9 includes a computer system. The processing device 9 includes: a computing device 9A including a processor, such as a central processing unit (CPU); a storage device 9B including a nonvolatile memory, such as a read only memory (ROM) or a storage, and a volatile memory, such as a random access memory (RAM); and an input and output interface 9C including an input and output circuit that can input and output a signal and data.

The imaging device 8, the output device 10, and the input device 11 are connected to the input and output interface 9C of the processing device 9.

The output device 10 outputs the detection result of the processing device 9. As the output device 10, at least one of a display device and a printing device is exemplified. The display device includes a flat panel display, such as a liquid crystal display (LCD) or an organic EL (electroluminescence) display (OELD).

The input device 11 generates an input signal by being operated by the operator, and outputs the generated input signal to the processing device 9. As the input device 11, at least one of an operation button, a touch panel, and a computer keyboard is exemplified.

The computing device 9A includes an image acquisition unit 91, an image processing unit 92, a determination unit 93, and an output unit 94. The storage device 9A includes a reference feature amount storage unit 95 and a correct feature amount storage unit 96.

The image acquisition unit 71 acquires the image of the sewing object S from the imaging device 8.

The image processing unit 92 performs image processing on the image acquired by the image acquisition unit 91. The image processing unit 92 performs the image processing on the image acquired by the image acquisition unit 91 and calculates the detected feature amount indicating the actual feature amount of the seam SE.

The determination unit 93 determines the presence and absence of the abnormality of the seams SE based on the image processing result of the image processing unit 92. In addition, the determination unit 93 determines the pattern of abnormality of the seams SE based on the image processing result of the image processing unit 92.

The output unit 94 outputs the output data including at least one of the image acquired by the image acquisition unit 91, the image processing result of the image processing unit 92, and the determination result of the determination unit 93, to the output device 10. The output device 10 outputs the output data from the output unit 94.

The reference feature amount storage unit 95 stores a reference feature amount of the seam SE. The reference feature amount includes a normal feature amount indicating a feature amount of normal seams SE and an abnormal feature amount indicating a feature amount of abnormal seams SE. The reference feature amount is known data that can be derived from operating conditions of the sewing machine 1, design data of the sewing machine 1, resource data of the sewing thread ST, preliminary experiment (including simulation experiment), and the like, and is stored in the reference feature amount storage unit 95.

The correct feature amount storage unit 96 stores the correct feature amount for a projection waveform which will be described later.

The determination unit 93 collates the detected feature amount of the seam SE calculated by the image processing unit 92 with the reference feature amount of the seam SE stored in the reference feature amount storage unit 95, and determines the pattern of abnormality of the seams SE.

Abnormality of Seam

Figure 5:
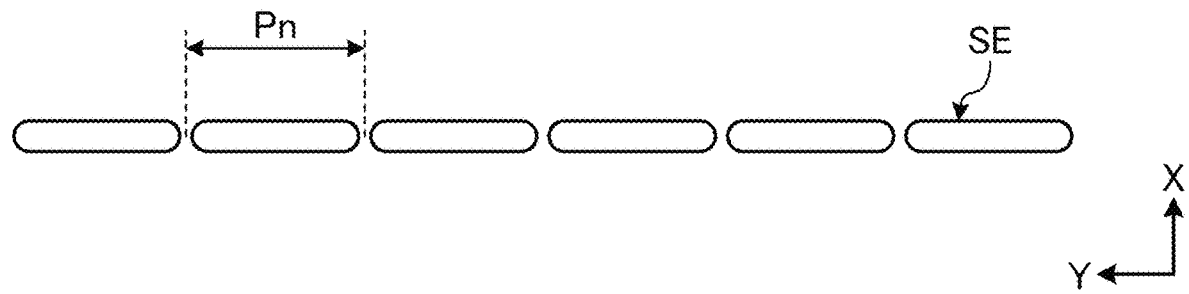
FIG. 5 is a view schematically illustrating an example of normal seams according to the embodiment.
Figure 6A:
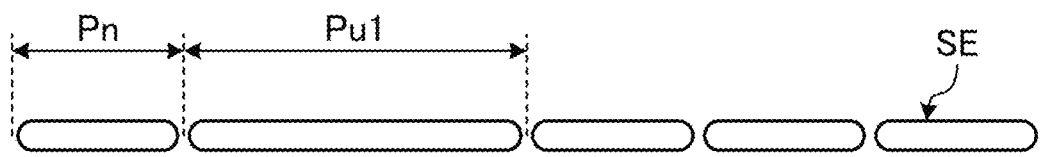
FIGS. 6A to 6C are views schematically illustrating an example of abnormal seams according to the embodiment.
Figure 6B:
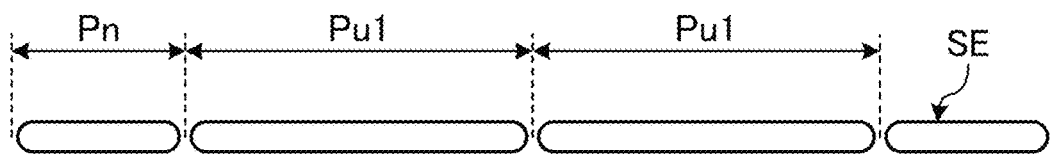
Figure 6C:
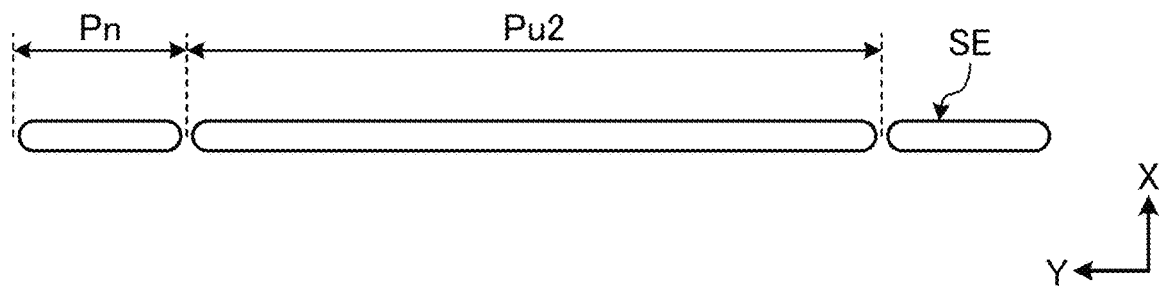

The abnormality of the seams SE includes the presence and absence of abnormality of the seams SE and the pattern of abnormality of the seams SE. FIG. 5 is a view schematically illustrating an example of normal seams SE according to the embodiment. FIGS. 6A to 6C are views schematically illustrating an example of abnormal seams SE according to the embodiment.

In the embodiment, the sewing machine 1 is a lockstitch sewing machine that performs lockstitch. As illustrated in FIG. 5, the normal seam SE in the lockstitch is formed linearly in the Y-axis direction. One normal seam SE is formed with a normal length Pn. Each of the plurality of seams SE is formed with the normal length Pn.

A plurality of patterns of abnormality of the seam SE exist. As the pattern of abnormality of the seams SE, an abnormality of a first pattern in which the length of at least one seam SE increases, an abnormality of a second pattern in which the width of at least a part of the seams SE increases, an abnormality of the third pattern in which the sewing thread ST becomes slack on the surface of the sewing object S, and an abnormality of a fourth pattern in which the length of the seam SE changes are exemplified. The abnormality of the first pattern is called "eyelet skipping". The abnormality of the second pattern is called "twisted lantern". The abnormality of the third pattern is called "upper thread floating". The abnormality of the fourth pattern is called "pitch abnormality".

FIGS. 6A to 6C are views illustrating an example of the "eyelet skipping" which is the abnormality of the first pattern. The "eyelet skipping" refers to a phenomenon in which the seams SE are formed with an abnormal length Pu longer than the normal length Pn without forming the seams SE with the constant normal length Pn. As a pattern of the "eyelet skipping", "single eyelet skipping" in which the seams SE having an abnormal length Pu1 are singly generated as illustrated in FIG. 6A, "continuous eyelet skipping" in which the seams SE having the abnormal length Pu1 are continuously generated as illustrated in FIG. 6B, and "long eyelet skipping" in which the seams SE having an abnormal length Pu2 longer than the abnormal length Pu1 are generated as illustrated in FIG. 6C, are exemplified.

The reference feature amount includes the abnormal length Pu (Pu1, Pu2) longer than the normal length Pn of the seam SE. In the reference feature amount storage unit 95, the abnormal length Pu (Pu1, Pu2) is stored as a reference feature amount indicating the feature amount of the abnormal seams SE. The normal length Pn is known data derived from the operating conditions of the sewing machine 1 and the like. The abnormal length Pu is an integer multiple of the normal length Pn and is known data derived from the normal length Pn.

The detected feature amount includes the actual length Pr of the seams SE. The image processing unit 92 performs the image processing on the image acquired by the image acquisition unit 91 and calculates the actual length Pr of the seams SE as the detected feature amount indicating the actual feature amount of the seam SE. The determination unit 93 collates the length Pr calculated by the image processing unit 92 with the abnormal length Pu stored in the reference feature amount storage unit 95, and determines whether or not the abnormality of the seams SE is the abnormality of the first pattern in which the length Pr of at least one seam SE increases, that is, "eyelet skipping".

The determination unit 93 collates the length Pr calculated by the image processing unit 92 with the abnormal length Pu1 stored in the reference feature amount storage unit 95, and when it is determined that the length Pr matches the abnormal length Pu1, the determination unit 93 determines that the pattern of abnormality of the seams SE is "single eyelet skipping" as illustrated in FIG. 6A.

In addition, the determination unit 93 collates the length Pr calculated by the image processing unit 92 with the abnormal length Pu1 stored in the reference feature amount storage unit 95, and when it is determined that the lengths Pr of two adjacent seams SE respectively match the abnormal length Pu1, the determination unit 93 determines that the pattern of abnormality of the seams SE is "continuous eyelet skipping" as illustrated in FIG. 6B.

In addition, the determination unit 93 collates the length Pr calculated by the image processing unit 92 with the abnormal length Pu2 stored in the reference feature amount storage unit 95, and when it is determined that the length Pr matches the abnormal length Pu2, the determination unit 93 determines that the pattern of abnormality of the seams SE is "long eyelet skipping" as illustrated in FIG. 6C.

The "twisted lantern" which is the abnormality of the second pattern refers to a phenomenon in which a lump of the sewing thread ST is generated at a part of the seams SE with the sewing thread ST twisted and a width Wr of at least a part of seams SE increases. Normal seams SE are formed with a normal width Wn. In a case where the "twisted lantern" occurs, the width Wr of at least a part of the seams SE increases.

The reference feature amount includes an abnormal width Wu thicker than the normal width Wn of the seam SE. In the reference feature amount storage unit 95, the abnormal width Wu is stored as a reference feature amount indicating the feature amount of the abnormal seams SE. The normal width Wn is known data derived from the thickness of the sewing thread ST to be used, the operating conditions of the sewing machine 1 and the like. The abnormal width Wu is thicker than the normal width Wn and is known data derived from the normal width Wn.

The detected feature amount includes the actual width Wr of the seams SE. The image processing unit 92 performs the image processing on the image acquired by the image acquisition unit 91 and calculates the actual width Wr of the seams SE as the detected feature amount indicating the actual feature amount of the seam SE. The determination unit 93 collates the width Wr calculated by the image processing unit 92 with the abnormal width Wu stored in the reference feature amount storage unit 95, and determines whether or not the abnormality of the seams SE is the abnormality of the second pattern in which the width Wr of at least a part of the seams SE increases, that is, "twisted lantern".

The determination unit 93 collates the width Wr calculated by the image processing unit 92 with the abnormal width Wu stored in the reference feature amount storage unit 95, and when it is determined that the width Wr matches the abnormal width Wu, the determination unit 93 determines that the pattern of abnormality of the seams SE is the "twisted lantern".

The "upper thread floating" which is the abnormality of the third pattern refers to a phenomenon in which the sewing thread ST (upper thread) becomes slack on the surface of the sewing object S. The normal seams SE are formed linearly. In a case where the "upper thread floating" occurs, at least a part of the seams SE meanders.

The reference feature amount includes an abnormal area Au greater than a normal area An defined on the surface of the sewing object S by the seams SE. In the reference feature amount storage unit 95, the abnormal area Au is stored as a reference feature amount indicating the feature amount of the abnormal seams SE. The normal area An is substantially zero and is known data. The abnormal area Au is known data greater than the normal area An.

The detected feature amount includes an actual area Ar defined on the surface of the sewing object S by the seams SE. The image processing unit 92 performs the image processing on the image acquired by the image acquisition unit 91 and calculates the actual area Ar defined on the surface of the sewing object S by the seams SE as the detected feature amount indicating the actual feature amount of the seam SE. The determination unit 93 collates the area Ar calculated by the image processing unit 92 with the abnormal area Au stored in the reference feature amount storage unit 95, and determines whether or not the abnormality of the seams SE is the abnormality of the third pattern in which the sewing thread ST becomes slack on the surface of the sewing object S, that is, "upper thread floating".

The determination unit 93 collates the area Ar calculated by the image processing unit 92 with the abnormal area Au stored in the reference feature amount storage unit 95, and when it is determined that the area Ar matches the abnormal width Au, the determination unit 93 determines that the pattern of abnormality of the seams SE is the "upper thread floating".

The "pitch abnormality" which is the fourth pattern refers to a phenomenon in which the length Pr of the seam SE changes without forming the seams SE with the constant length Pr. The normal seam SE is formed with the constant normal length Pn. Meanwhile, in a case where the "pitch abnormality" occurs, the length Pr of the seam SE changes without being constant.

The reference feature amount includes the normal length Pn of the seams SE. In the reference feature amount storage unit 95, the normal length Pn is stored as a reference feature amount indicating the feature amount of the normal seams SE. The normal length Pn is known data derived from the operating conditions of the sewing machine 1 and the like.

The detected feature amount includes the actual length Pr of the seams SE. The image processing unit 92 performs the image processing on the image acquired by the image acquisition unit 91 and calculates the actual length Pr of the seams SE as the detected feature amount indicating the actual feature amount of the seam SE. The determination unit 93 collates the length Pr calculated by the image processing unit 92 with the abnormal length Pu stored in the reference feature amount storage unit 95, and determines whether or not the abnormality of the seams SE is the abnormality of the fourth pattern in which the length Pr of the seam SE changes, that is, "pitch abnormality".

The determination unit 93 collates the length Pr calculated by the image processing unit 92 with the normal length Pn stored in the reference feature amount storage unit 95, and when it is determined that the lengths Pr of the plurality of seams SE match the normal length Pn, the determination unit 93 determines that the pattern of abnormality of the seams SE is the "pitch abnormality".

Seam Inspection Method

Figure 7:
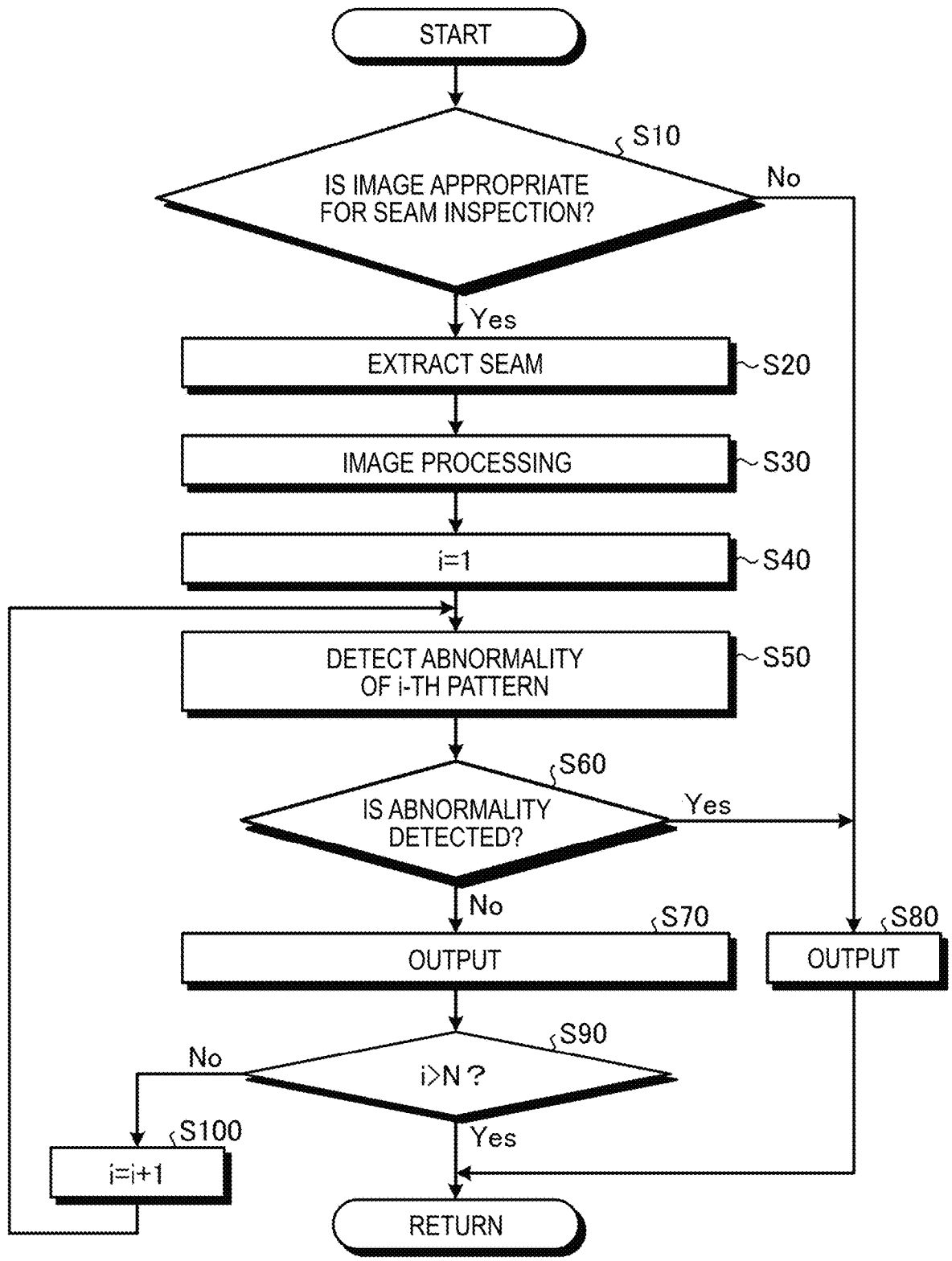
FIG. 7 is a flowchart illustrating an example of a seam inspection method according to the embodiment.

Next, a seam inspection method using the seam inspection device 7 according to the embodiment will be described. FIG. 7 is a flowchart illustrating an example of the sewing method according to the embodiment. As illustrated in FIG. 7, the seam inspection method includes: a step S10 of determining whether the acquired image is an image appropriate for the seam inspection; a step S20 of extracting the seams SE from the image; a step S30 of performing the image processing on a partial image from which the seams SE are extracted; a step S40 of setting a counter i to an initial value; a step S50 of detecting the abnormality of an i-th pattern; a step S60 of determining whether or not the abnormality is detected; a step S70 of outputting the output data; a step S80 of outputting the output data; a step S90 of comparing the counter i with a defined value N; and a step S100 of incrementing the counter i. The process illustrated in FIG. 7 is performed at a defined cycle.

The operator starts the sewing of the sewing object S using the sewing machine 1. In addition, the operator operates the input device 11 to command the start of the seam inspection. As the input device 11 is operated, the seam inspection device 7 is activated. The imaging device 8 starts the imaging of the sewing object S in which the seams SE are formed by the sewing machine 1 and which is supported by the throat plate 5. The image of the sewing object S acquired by the imaging device 8 is output to the processing device 9.

The image acquisition unit 91 acquires the image of the sewing object S from the imaging device 8. The image processing unit 92 performs the image processing on the image acquired by the image acquisition unit 91. The determination unit 93 determines whether or not the image acquired by the image acquisition unit 91 is an image appropriate for the seam inspection (step S10).

There is a case where the imaging device 8 acquires images inappropriate for the seam inspection. As the image inappropriate for the seam inspection, an image in which the seam SE does not exist from the beginning, such as an image in which the sewing object S is not reflected and only a part of the sewing machine 1 is reflected, or an image in which the sewing object S is reflected and the seam SE is not reflected, is exemplified. In addition, as an image inappropriate for the seam inspection, an image in which the hand of the operator and other obstacles are reflected, an image immediately after formation of the seam SE by the sewing machine 1 has started, an image immediately before the formation of the seam SE by the sewing machine 1 is ended, an image in which the seam SE has a shape of a curve, an image including the seam SE formed in a stepped portion of the sewing object S, an image of the sewing object S which is twisting or floating from the throat plate 5, and the like are exemplified.

In addition, as the image inappropriate for the seam inspection, an image acquired while the sewing object S is moving is exemplified. The sewing machine 1 forms the seams SE in the sewing object S while repeatedly moving and stopping the sewing object S. The imaging device 8 acquires an image at a predetermined cycle (for example, every 33 mSec.). The time required for the sewing machine 1 to perform the sewing by one stitch is a defined time (for example, 20 mSec.). The moving time of the sewing object S when the sewing machine 1 performs the sewing by one stitch is a first defined time (for example, 9 mSec.), and the stop time of the sewing object S when the sewing machine 1 performs the sewing by one stitch is a second defined time (for example, 11 mSec.).

There is a high possibility that the image of the sewing object S acquired while the sewing object S is moving is disturbed by the rolling shutter phenomenon. There is a low possibility that the image of the sewing object S acquired while the sewing object S is stopped is disturbed. Therefore, the image of the sewing object S acquired while the sewing object S is moving is an image inappropriate for the seam inspection, and the image of the sewing object S acquired while the sewing object S is stopped is an image appropriate for the seam inspection.

Figure 8A:
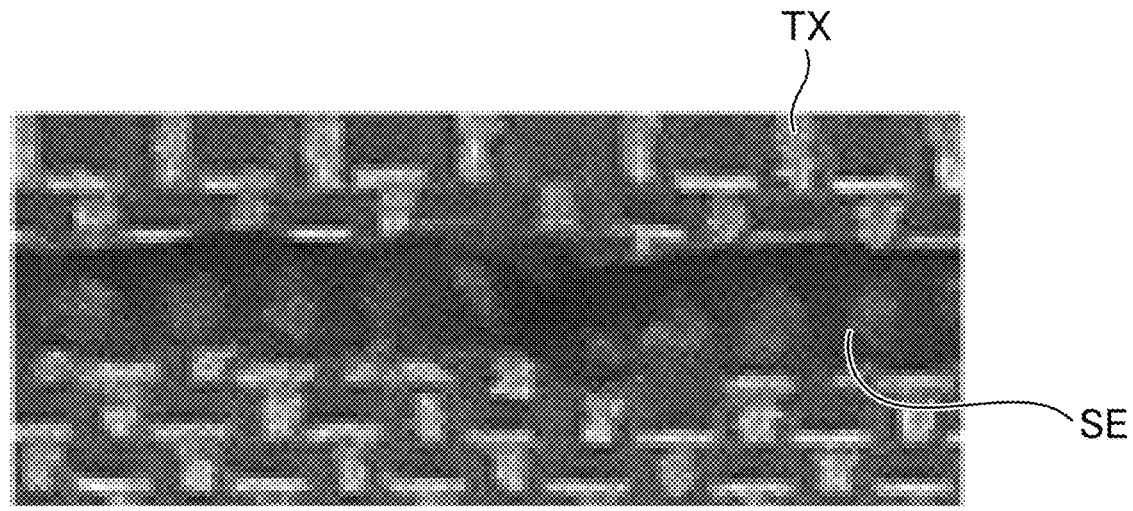
FIGS. 8A and 8B are views illustrating an example of an image of a sewing object according to the embodiment.
Figure 8B:
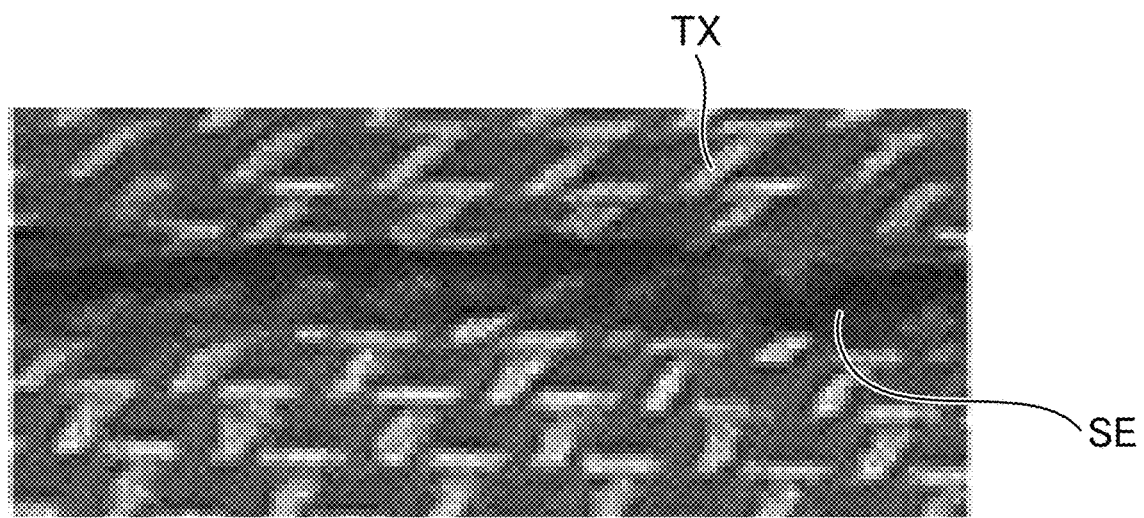

FIGS. 8A and 8B are views illustrating an example of an image of the sewing object S according to the embodiment. FIG. 8A is an image of the sewing object S acquired while the sewing object S is stopped. FIG. 8B is an image of the sewing object S acquired while the sewing object S is moving. As illustrated in FIG. 8, a grid-like weave TX exists in the sewing object S. As illustrated in FIG. 8A, in the image of the sewing object S acquired while the sewing object S is stopped, the weave TX of the sewing object S is substantially parallel to the X axis and the Y axis, respectively. In other words, in the image of the sewing object S acquired while the sewing object S is stopped, the weave TX is reflected in the same shape as the actual shape. Meanwhile, as illustrated in FIG. 8B, in the image of the sewing object S acquired while the sewing object S is moving, at least a part of the weave TX of the sewing object S is inclined with respect to the X axis. In other words, in the image of the sewing object S acquired while the sewing object S is moving, the weave TX is reflected in a shape different from the actual shape. Therefore, based on the weave TX of the sewing object S, the processing device 9 can determine which image among the plurality of images acquired at the predetermined cycle by the imaging device 8 is an image acquired while the sewing object S is stopped and which image is an image acquired while the object S is moving.

The determination unit 93 determines whether or not the image acquired by the image acquisition unit 91 is an image acquired while the sewing object S is stopped, based on the weave TX of the sewing object S. The processing device 9 detects the abnormality of the seams SE based on the image acquired during the stop. In other words, the seam inspection device 7 performs the seam inspection using the image acquired while the sewing object S is stopped without using the image acquired while the sewing object S is moving.

Figures 9A, 9B:
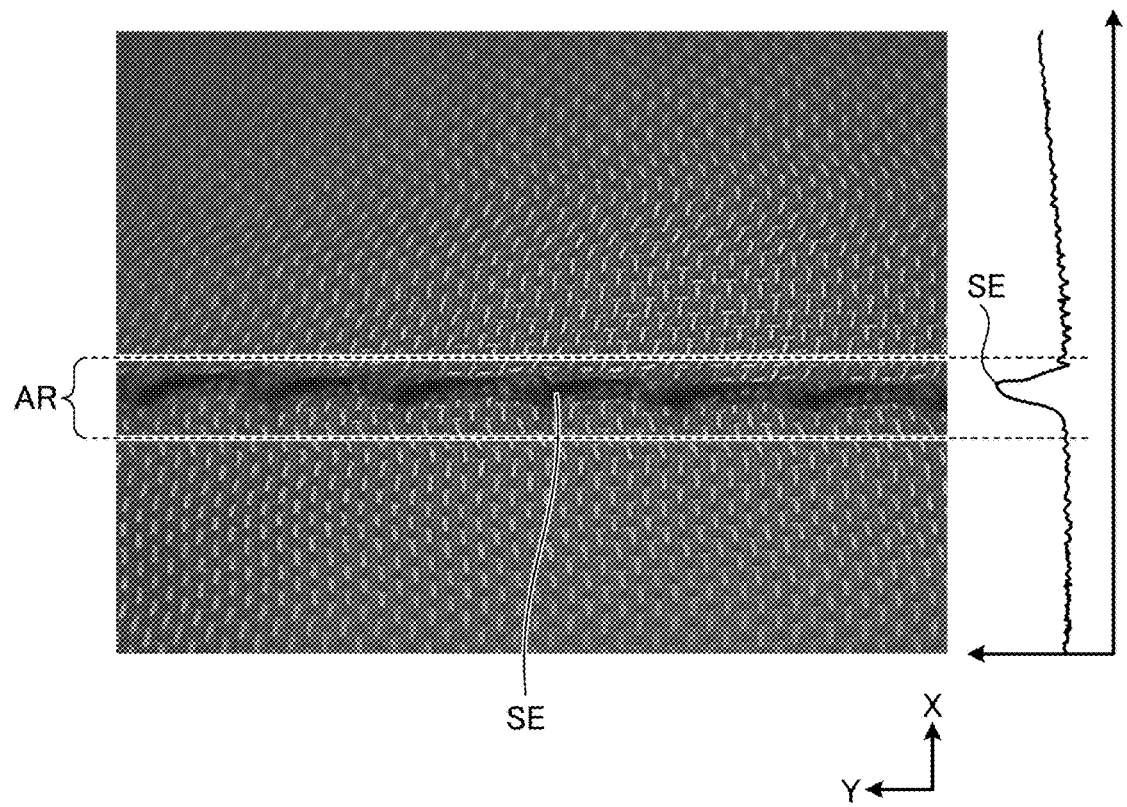
FIGS. 9A to 9B are views illustrating an example of the image of the sewing object according to the embodiment.

FIGS. 9A to 9B are views illustrating an example of an image of the sewing object S according to the embodiment. FIG. 9A illustrates an image of the sewing object S acquired while the sewing object S is stopped. The image illustrated in FIG. 9A is an image appropriate for the seam inspection, and the seam SE extends linearly in the Y-axis direction. FIG. 9B is a view illustrating an example of the projection waveform calculated by performing projection processing on the image of FIG. 9A.

The projection processing is a processing of calculating a distribution of a total value of pixel data when each of a plurality of pieces of pixel data of the image is projected in a projection direction. The pixel data is, for example, the density of the pixel. In addition, the pixel data may be the brightness of a pixel or the saturation of a pixel.

The image processing unit 92 performs the projection processing on the image in the Y-axis direction. By imaging the sewing object S from the inclination direction with respect to the normal line of the upper surface of the throat plate 5 by the imaging device 8, the image processing unit 92 can calculate the projection waveform of the sewing object S with high accuracy based on the image acquired by the imaging device 8.

In FIG. 9B, the lateral axis indicates the position in the X-axis direction, and the longitudinal axis indicates the total value (density value) of the density of the pixel. As illustrated in FIG. 9B, in the projection waveform, the density value in the range where the surface of the sewing object S exists is substantially constant, and the density value in the range where the seam SE exists increases. Based on the projection waveform calculated by the image processing unit 92, the determination unit 93 can determine whether or not the seams SE exist in the image, that is, whether or not the image is an image appropriate for the seam inspection.

When it is determined in step S10 that the image acquired by the image acquisition unit 91 is an image inappropriate for the seam inspection (step S10: No), the output unit 94 outputs the output data indicating that the image is an image inappropriate for the seam inspection, to the output device 10 (step S80). The seam inspection device 7 ends the seam inspection processing based on the image acquired by the image acquisition unit 91.

When it is determined in step S10 that the image acquired by the image acquisition unit 91 is an image appropriate for the seam inspection (step S10: Yes), the image processing unit 92 extracts the seam SE from the image acquired by the image acquisition unit 91 (step S20).

Based on the projection waveform illustrated in FIG. 9B, the image processing unit 92 calculates a seam existence range AR in which the seam SE exists from the image acquired by the image acquisition unit 91. Based on the seam existence range AR, the image acquisition unit 91 extracts a partial image including the seam SE from the image acquired by the image acquisition unit 91.

Figure 10:
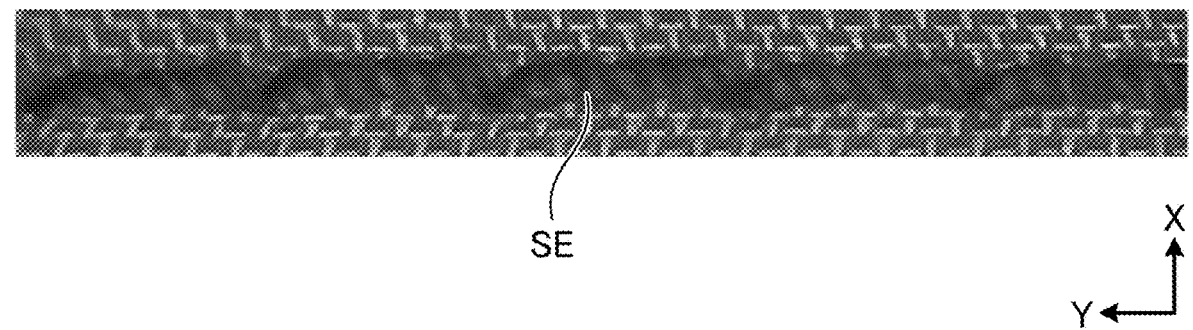
FIG. 10 is a view illustrating an example of a partial image according to the embodiment.

FIG. 10 is a view illustrating an example of a partial image including the seam SE according to the embodiment. The image processing unit 92 performs the image processing on the partial image from which the seams SE are extracted as illustrated in FIG. 10 (step S30) in order to detect the abnormality of the seams SE.

The image processing unit 92 converts the partial image which is an RGB image into an HSV image.

Figure 11:
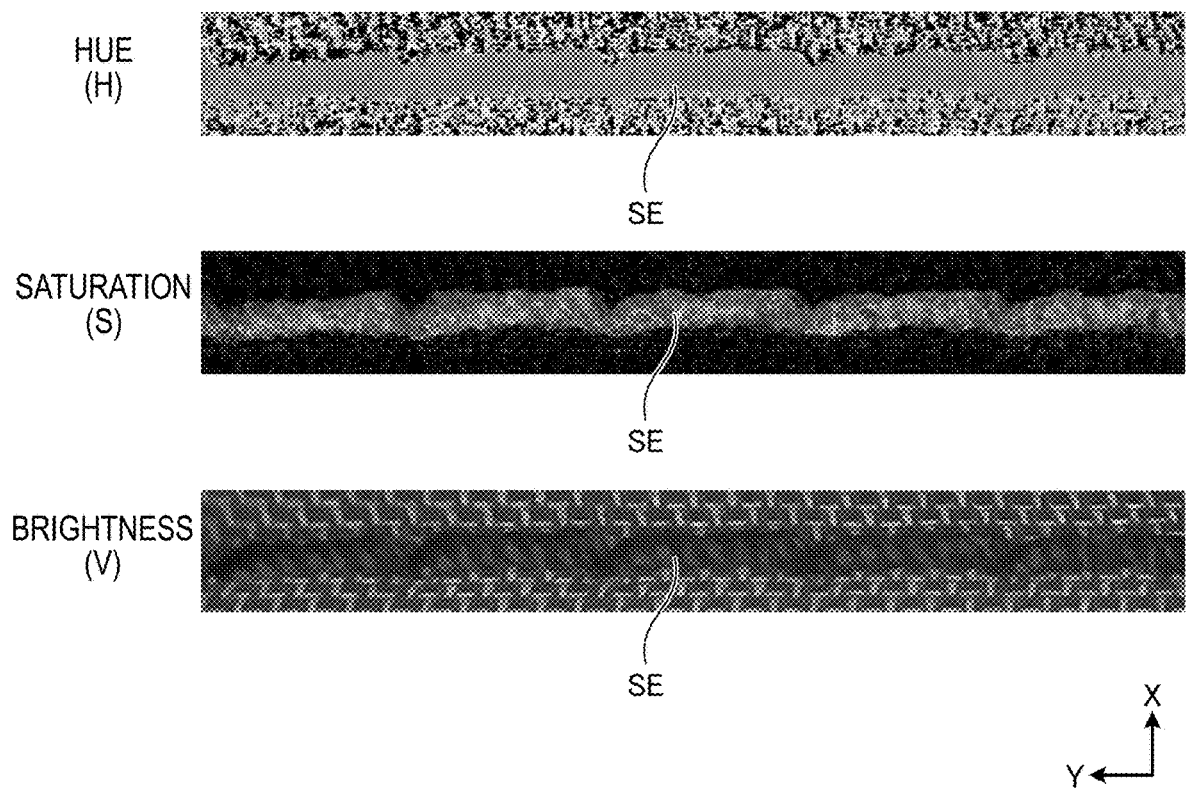
FIG. 11 is a view illustrating an example of an HSV image according to the embodiment.

FIG. 11 is a view illustrating an example of the HSV image according to the embodiment. The image processing unit 92 decomposes the RGB image respectively into a V image indicating the hue, an S image indicating the saturation, and a V image indicating the brightness (value), by using a defined conversion formula.

Next, the image processing unit 92 binarizes the S image and generates a mask pattern.

Figure 12:
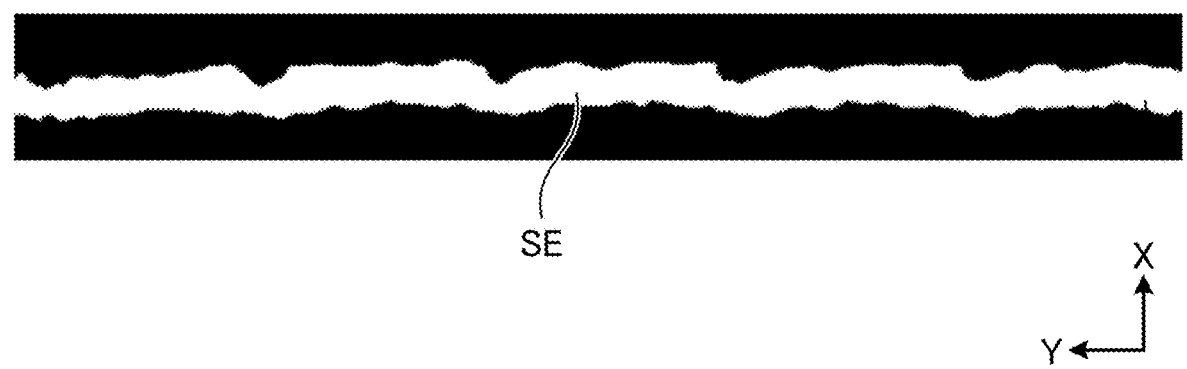
FIG. 12 is a view illustrating an example of a mask pattern according to the embodiment.

FIG. 12 is a view illustrating an example of the mask pattern according to the embodiment. The image processing unit 92 binarizes the S image after performing noise removal processing on the S image illustrated in FIG. 11. Accordingly, as illustrated in FIG. 12, a binarized mask pattern is generated.

Next, the image processing unit 92 calculates a logical product (AND) of the partial image illustrated in FIG. 10 and the mask pattern illustrated in FIG. 12.

Figure 13:
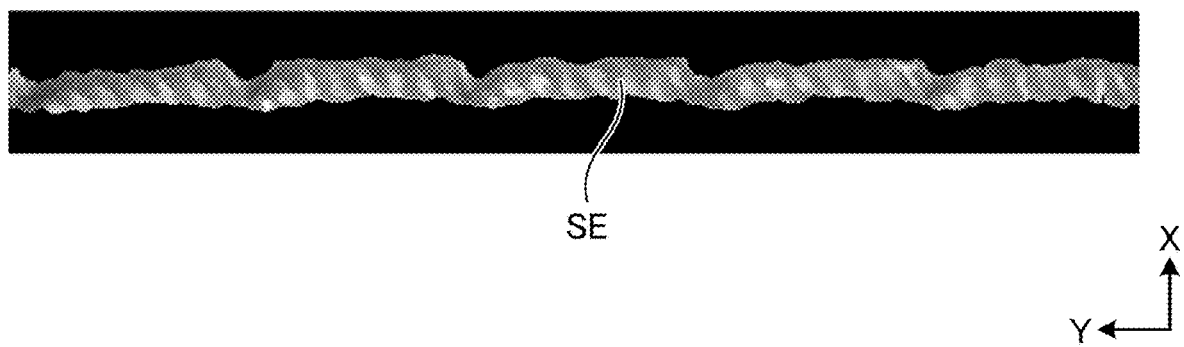
FIG. 13 is a view illustrating an example of a seam extracted image according to the embodiment.

FIG. 13 is a view illustrating an example of the calculation result of the logical product of the partial image and the mask pattern according to the embodiment. The image processing unit 92 sets two threshold values, such as an upper limit value and a lower limit value for each of the partial image and the mask pattern, calculates the logical product between the images from which only the pixels having the values between the upper limit value and the lower limit value are extracted, and generates a seam extracted image from which the image (background) of the sewing object S has been removed as illustrated in FIG. 13.

Next, the image processing unit 92 performs half-binary processing on the seam extracted image illustrated in FIG. 13.

Figure 14:
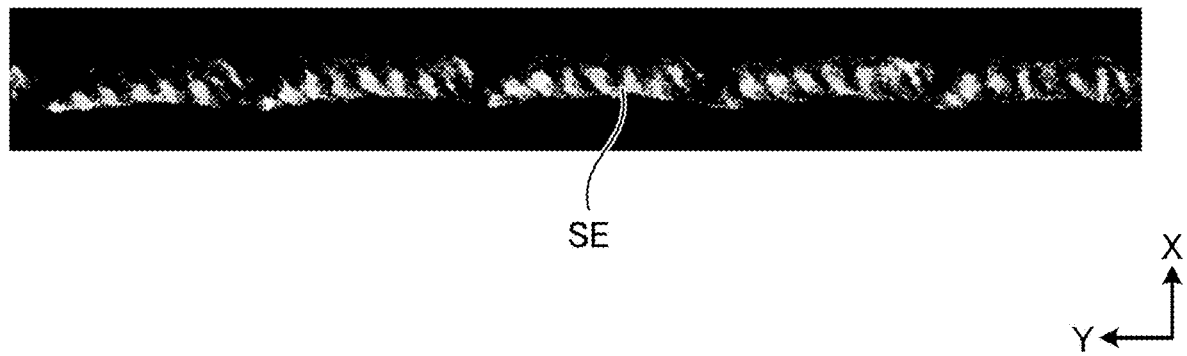
FIG. 14 is a view illustrating an example of a seam feature extracted image according to the embodiment.

FIG. 14 is a view illustrating an example of a half-binarized seam extracted image according to the embodiment. The image processing unit 92 acquires a threshold value for binarization from the density of the seam extracted image illustrated in FIG. 12, and sets all of the densities less than the threshold value to zero. Accordingly, the seam feature extracted image from which the feature of the seam SE is extracted is generated as illustrated in FIG. 14.

Next, the image processing unit 92 performs the projection processing on the seam feature extracted image illustrated in FIG. 14.

Figure 15A:
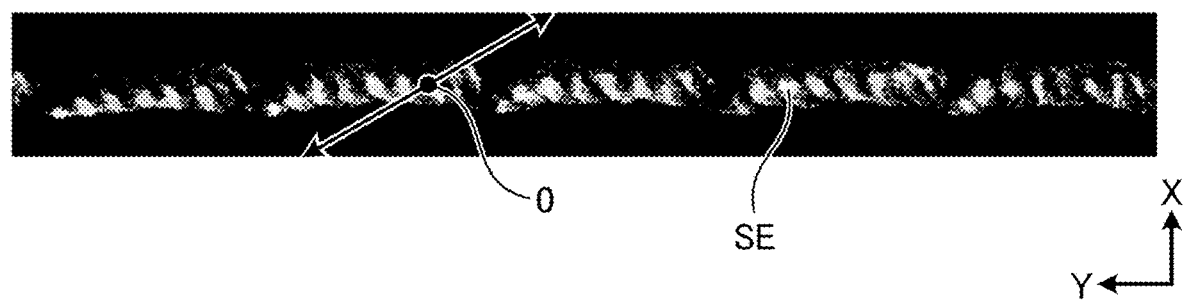
FIGS. 15A and 15B are views illustrating an example of a projection waveform according to the embodiment.
Figure 15B:
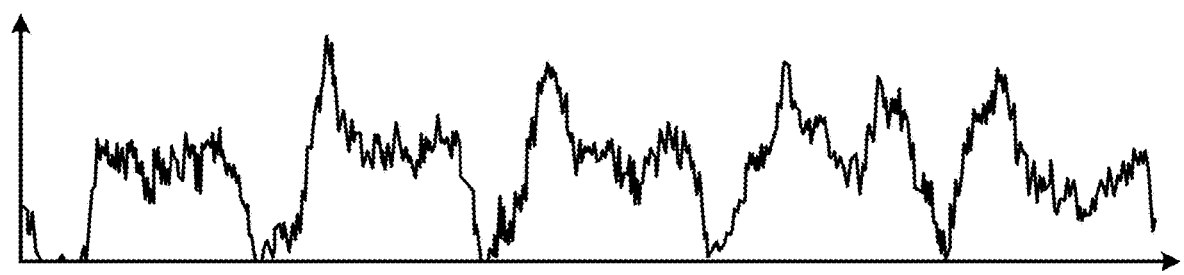

FIGS. 15A and 15B are views illustrating an example of the projection waveform according to the embodiment. FIG. 15A is the seam feature extracted image illustrated in FIG. 14. The image processing unit 92 performs the projection processing on the seam feature extracted image in the inclination direction with respect to the Y axis. In the embodiment, the image processing unit 92 performs the projection processing in the inclination direction of 30° with respect to the Y axis with reference to a projection starting point O as a reference. The coordinates of the projection starting point O in the X-axis direction is the center in the width direction of the seam SE, and the coordinate of the projection ending point in the Y-axis direction is the end portion of the seam feature extracted image in the Y-axis direction. By performing the projection processing in the inclination direction with respect to the Y axis, as illustrated in FIG. 15B, a projection waveform indicating the shape of the seam SE is calculated.

Next, the image processing unit 92 performs the noise removal processing on the projection waveform illustrated in FIG. 15B.

Figure 16:
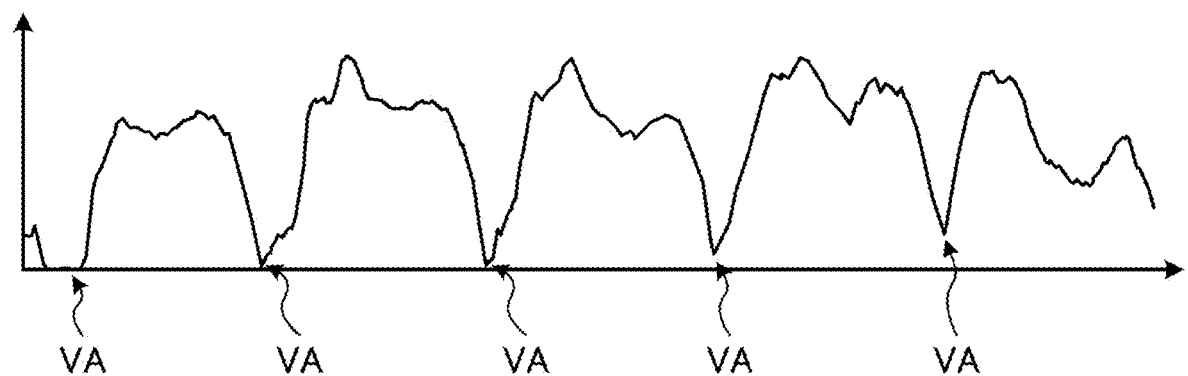
FIG. 16 is a view illustrating an example of the projection waveform according to the embodiment.

FIG. 16 is a view illustrating an example of the projection waveform in which the noise removal processing according to the embodiment is performed. In FIG. 16, the lateral axis indicates the position in the seam SE and the longitudinal axis indicates the density value. The image processing unit 92 performs the noise removal processing on the projection waveform illustrated in FIG. 15B with an average filter. The image processing unit 92 changes the filter size in proportion to the magnitude of the density value of the projection waveform. Accordingly, as illustrated in FIG. 16, the noise is sufficiently removed while maintaining the features of the projection waveform.

In FIG. 16, a valley VA of the projection waveform corresponds to the end portion of the seam SE. In other words, the valley VA corresponds to a hole through which the sewing thread ST penetrates the sewing object S. The image processing unit 92 detects the position of the valley VA.

A plurality of small valleys other than the valley VA exist in the projection waveform. The image processing unit 92 determines whether or not the valley VA among the plurality of valleys of the projection waveform is the end portion of the seam SE.

Figure 17:
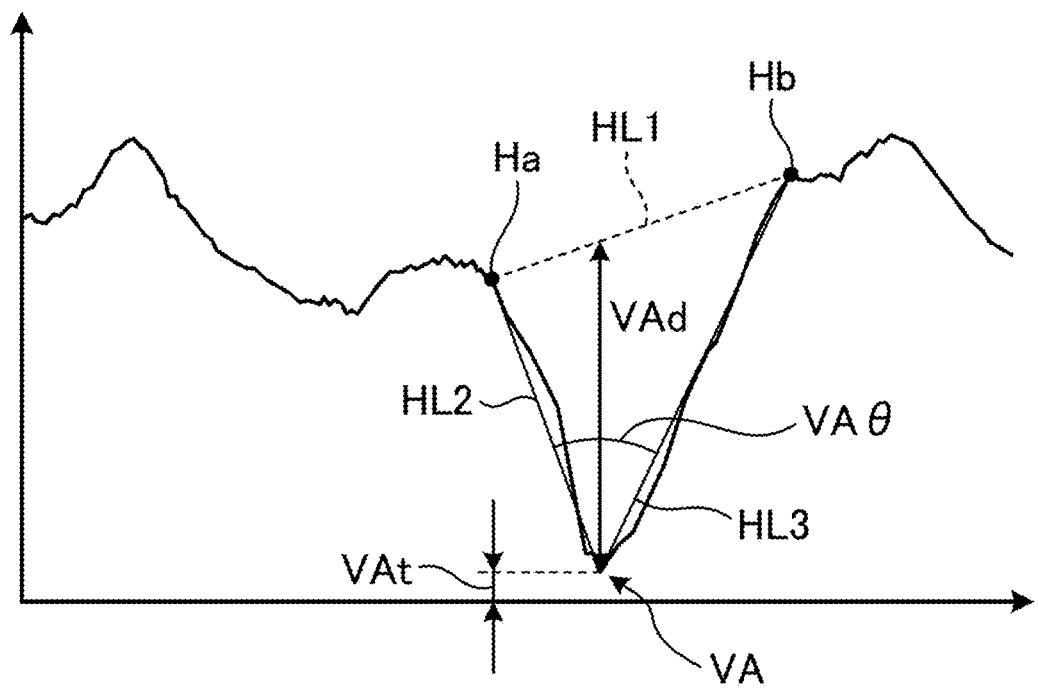
FIG. 17 is a schematic view for describing a method of determining an end portion of the seam according to the embodiment.

FIG. 17 is a schematic view for describing a method of determining the end portion of the seam SE according to the embodiment. As illustrated in FIG. 17, the image processing unit 92 calculates a height VAt of the valley VA, a depth VAd of the valley VA, and an angle VAθ of the valley VA in the projection waveform. The image processing unit 92 calculates an inflection point Ha and an inflection point Hb in the projection waveform. The inflection point Ha and the inflection point Hb are the points at which the gradient of the tangent changes from plus to minus. The valley VA is an inflection point that exists between the inflection point Ha and the inflection point Hb. The valley VA is a point at which the gradient of the tangent changes from minus to plus. In addition, the image processing unit 92 also calculates a first virtual line HL1 that connects the inflection point Ha and the inflection point Hb to each other, a second virtual line HL2 that connects the valley VA and the inflection point Ha to each other, and a third virtual line HL3 that connects the valley VA and the inflection point Hb to each other.

As illustrated in FIG. 17, the height VAt of the valley VA is the density value of the valley VA. The depth VAd of the valley VA is the distance between the first virtual line HL1 and the valley VA. The angle VAθ of the valley VA is an angle formed by the second virtual line HL2 and the third virtual line HL3. The height VAt of the valley VA, the depth VAd of the valley VA, and the angle VAθ of the valley VA indicate the feature amount of the valley VA.

The correct feature amount storage unit 96 (refer to FIG. 4) of the storage device 9B stores the correct feature amount indicating the feature amount when the valley VA is the end portion of the seam SE. At least one of the depth VAd, the height VAt, and the angle VAθ differs between a case where the valley VA is the end portion of the seam SE and a case where the valley VA is not the end portion of the seam SE. The correct feature amount is known data derived from the operating conditions of the sewing machine 1, the resource data of the sewing thread ST, and the like.

In a case where the valley VA is the end portion of the seam SE, the height VAt indicates a value of the correct height stored in the correct feature amount storage unit 96, the depth VAd indicates a value of the correct depth stored in the correct feature amount storage unit 96, and the angle VAθ indicates a value of the correct angle stored in the correct feature amount storage unit 96. The image processing unit 92 collates the feature amount of the valley VA including the depth VAd, the height VAt, and the angle VAθ calculated from the projection waveform with the correct feature amount of the valley VA including the correct depth, the correct height, and the correct angle stored in the correct feature amount storage unit 96, and determines that the valley VA is the end portion of the seam SE.

After the projection waveform is calculated and the position of the end portion of the seam SE is calculated based on the valley VA, the determination unit 93 sets the counter i to "1" which is the initial value (step S40).

The determination unit 93 detects the abnormality of the i-th pattern (first pattern) based on the projection waveform created by the image processing unit 92 (step S50).

Figure 18A:
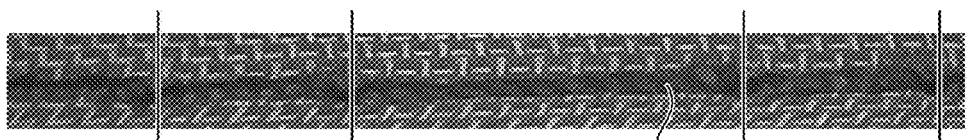
FIGS. 18A to 18C are views illustrating an example of a partial image, a seam feature extracted image, and a projection waveform when an abnormality of a first pattern according to the embodiment occurs.
Figure 18B:
Figure 18C:
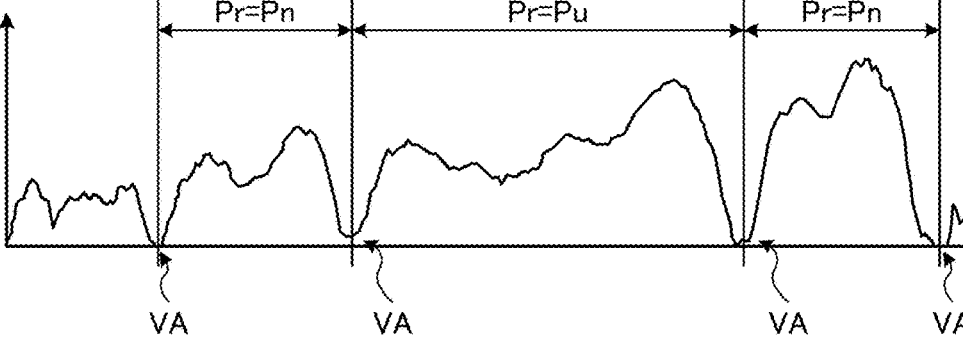

FIGS. 18A to 18C are views illustrating an example of a partial image, a seam feature extracted image, and a projection waveform when the abnormality of the first pattern according to the embodiment occurs. FIG. 18A illustrates the partial image, FIG. 18B illustrates the seam feature extracted image, and FIG. 18C illustrates the projection waveform.

As illustrated in FIG. 18C, in the projection waveform, the plurality of valleys VA are formed. The valley VA is the end portion of the seam SE. Therefore, the distance between the adjacent valleys VA is the length Pr of the seam SE.

The determination unit 93 collates each of the lengths Pr of the plurality of seams SE with the abnormal length Pu stored in the reference feature amount storage unit 95 and determines whether or not the abnormality of the first pattern in which the length Pr of at least a part of the seams SE increases occurs (step S60).

In the example illustrated in FIG. 18, the length Pr of one seam SE is the abnormal length Pu (Pu1). In a case where the length Pr of at least one seam SE is the abnormal length Pu, the determination unit 93 determines that the abnormality of the first pattern occurs in the seam SE. Meanwhile, in a case where the length Pr of all of the seams SE is the normal length Pn, the determination unit 93 determines that the abnormality of the first pattern does not occur in the seam SE.

When it is determined in step S60 that the abnormality of the first pattern occurs (step S60: Yes), the output unit 94 outputs the output data indicating that the abnormality of the first pattern occurs, to the output device 10 (step S80). When the abnormality occurs in the seam SE, the seam inspection device 7 ends the seam inspection processing.

When it is determined in step S60 that the abnormality of the first pattern does not occur (step S60: No), the output unit 94 outputs the output data indicating that the abnormality of the first pattern does not occur, to the output device 10 (step S70).

The determination unit 93 determines whether or not the counter i is greater than the defined value N (step S90). In the embodiment, the seam inspection device 7 detects each of the abnormality of the first pattern (eyelet skipping), the abnormality of the second pattern (twisted lantern), the abnormality of the third pattern (upper thread floating), and the abnormality of the fourth pattern (pitch abnormality). Therefore, the defined value N is 4. In addition, the defined value N is changed based on the number of patterns of abnormality to be inspected.

When it is determined in step S90 that the counter i is equal to or less than the defined value N (step S90: No), the determination unit 93 increments the counter i (step S100), and detects the abnormality of the i-th pattern (second pattern) (step S50).

Figure 19A:
FIGS. 19A and 19B are views illustrating an example of a partial image and a projection waveform when an abnormality of a second pattern according to the embodiment occurs.
Figure 19B:
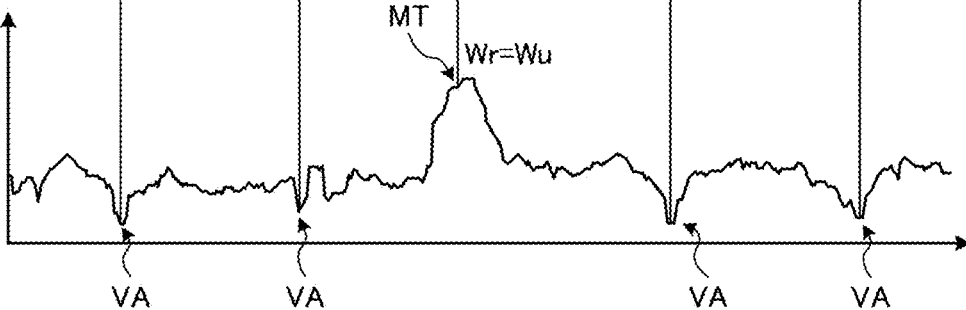

FIGS. 19A and 19B are views illustrating an example of a partial image and a projection waveform when the abnormality of the second pattern according to the embodiment occurs. FIG. 19A illustrates the partial image and FIG. 19B illustrates the projection waveform.

As illustrated in FIG. 19B, in the projection waveform, the plurality of valleys VA are formed. The valley VA is the end portion of the seam SE. As described above, the image processing unit 92 performs the projection processing on the seam feature extracted image in the inclination direction with respect to the Y axis. In the projection waveform, as the density value decreases, the width Wr of the seam SE decreases, and as the density value increases, the width Wr of the seam SE increases. In the valley VA of the projection waveform, the width Wr of the seam SE is narrow. In a mountain MT of the projection waveform, the width Wr of the seam SE is thick.

The determination unit 93 collates the width Wr of the seam SE with the abnormal length Wu stored in the reference feature amount storage unit 95 and determines whether or not the abnormality of the second pattern in which the width Wr of at least a part of the seams SE increases occurs (step S60).

In the example illustrated in FIG. 19, the width Wr of the seam SE in the mountain MT is the abnormal width Wu. In a case where the width Wr of at least a part of the seams SE is the abnormal width Wu, the determination unit 93 determines that the abnormality of the second pattern occurs in the seam SE. Meanwhile, in a case where the width Wr of all of the seams SE is the normal width Wn, the determination unit 93 determines that the abnormality of the second pattern does not occur in the seam SE.

When it is determined in step S60 that the abnormality of the second pattern occurs (step S60: Yes), the output unit 94 outputs the output data indicating that the abnormality of the second pattern occurs, to the output device 10 (step S80). When the abnormality occurs in the seam SE, the seam inspection device 7 ends the seam inspection processing.

When it is determined in step S60 that the abnormality of the second pattern does not occur (step S60: No), the output unit 94 outputs the output data indicating that the abnormality of the second pattern does not occur, to the output device 10 (step S70).

The determination unit 93 determines whether or not the counter i is greater than the defined value N (step S90).

When it is determined that the counter i is equal to or less than the defined value N (step S90: No), the determination unit 93 increments the counter i (step S100), and detects the abnormality of the i-th pattern (third pattern) (step S50).

Figure 20A:
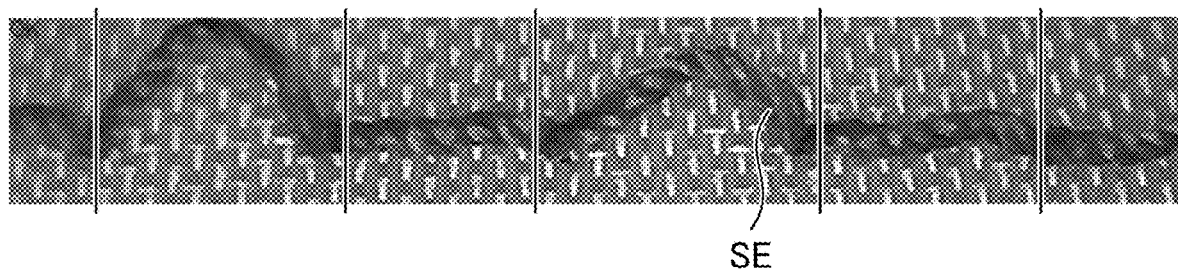
FIGS. 20A and 20B are views illustrating an example of a partial image and a projection waveform when an abnormality of a third pattern according to the embodiment occurs.
Figure 20B:
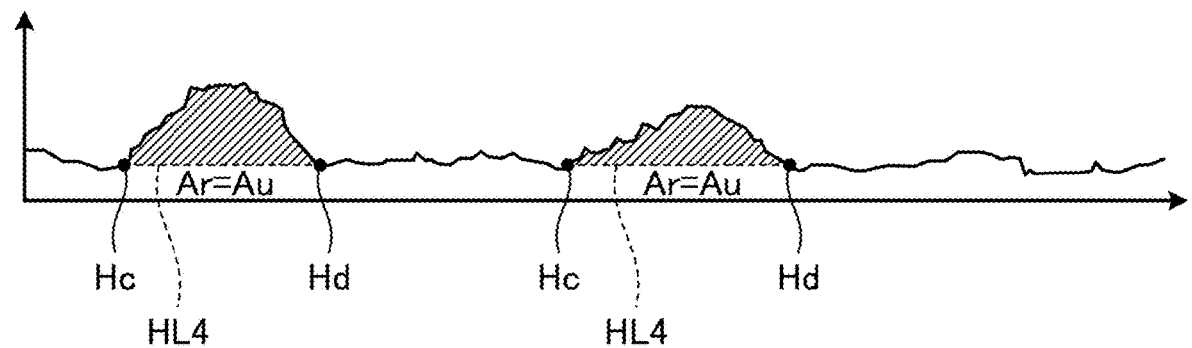

FIGS. 20A and 20B are views illustrating an example of a partial image and a projection waveform when the abnormality of the third pattern according to the embodiment occurs. FIG. 20A illustrates the partial image, and FIG. 20B illustrates a seam shape line in the XY plane in which the seam SE in the seam feature extracted image is calculated by the noise removal processing.

As illustrated in FIG. 20B, the seam shape line meanders. The image processing unit 92 calculates an inflection point Hc and an inflection point Hd in the seam shape line. The inflection point Hc and the inflection point Hd are the points at which the gradient of the tangent changes from minus to plus. Further, the image processing unit 92 calculates a fourth virtual line HL4 that connects the inflection point Hc and the inflection point Hd to each other.

The image processing unit 92 calculates the area Ar defined on the surface of the sewing object S by the seams SE. The area Ar is an area of the region surrounded by the seam shape line and the fourth virtual line HL4. When the seam shape line is meandering largely, the area Ar becomes large. When the seam shape line is linear, the inflection point Hc and the inflection point Hd do not exist, and the area Ar becomes substantially zero.

The determination unit 93 collates the area Ar defined by the seams SE with the abnormal area Au stored in the reference feature amount storage unit 95 and determines whether or not the abnormality of the third pattern in which the sewing thread ST becomes slack on the surface of the sewing object S occurs (step S60).

In the example illustrated in FIGS. 20A and 20B, the area Ar is not zero but the abnormal area Au. In a case where the area Ar is the abnormal area Au, the determination unit 93 determines that the abnormality of the third pattern occurs in the seam SE. Meanwhile, in a case where all of the seams SE are linear and the area Ar defined by the seams SE is the normal area An (substantially zero), the determination unit 93 determines that the abnormality of the third pattern does not occur in the seam SE.

When it is determined in step S60 that the abnormality of the third pattern occurs (step S60: Yes), the output unit 94 outputs the output data indicating that the abnormality of the third pattern occurs, to the output device 10 (step S80). When the abnormality occurs in the seam SE, the seam inspection device 7 ends the seam inspection processing.

When it is determined in step S60 that the abnormality of the third pattern does not occur (step S60: No), the output unit 94 outputs the output data indicating that the abnormality of the third pattern does not occur, to the output device 10 (step S70).

The determination unit 93 determines whether or not the counter i is greater than the defined value N (step S90).

When it is determined in step S90 that the counter i is equal to or less than the defined value N (step S90: No), the determination unit 93 increments the counter i (step S100), and detects the abnormality of the i-th pattern (fourth pattern) (step S50).

As described with reference to FIG. 18, the length Pr of the seam SE is defined by the distance between the adjacent valleys VA.

The determination unit 93 collates each of the lengths Pr of the plurality of seams SE with the abnormal length Pu stored in the reference feature amount storage unit 95 and determines whether or not the abnormality of the fourth pattern in which the length Pr of the seam SE changes occurs (step S60).

When it is determined in step S60 that the abnormality of the fourth pattern occurs (step S60: Yes), the output unit 94 outputs the output data indicating that the abnormality of the fourth pattern occurs, to the output device 10 (step S80). When the abnormality occurs in the seam SE, the seam inspection device 7 ends the seam inspection processing.

When it is determined in step S60 that the abnormality of the fourth pattern does not occur (step S60: No), the output unit 94 outputs the output data indicating that the abnormality of the fourth pattern does not occur, to the output device 10 (step S70).

The determination unit 93 determines whether or not the counter i is greater than the defined value N (step S90).

When it is determined in step S90 that the counter i is greater than the defined value N (step S90: Yes), the seam inspection device 7 ends the seam inspection processing.

In addition, as the operator operates the input device 11 to command the end of the seam inspection, the seam inspection processing may be ended.

Effects

As described above, according to the embodiment, the seam inspection device 7 includes: the imaging device 8 which shoots the sewing object S supported by the throat plate 5 of the sewing machine 1 and having the seams SE formed therein; and the processing device 9 which detects the abnormality of the seams SE based on the image of the sewing object S acquired by the imaging device 8. Accordingly, the seam inspection device 7 can detect the abnormality of the seam SE in parallel with the formation of the seam SE by the sewing machine 1. For example, in a sewing factory, in a case where the clothes are produced by a line production method using the plurality of sewing machines 1, the seam inspection devices 7 are provided for each of the plurality of sewing machines 1, and accordingly, the seam inspection can be performed in the middle of the sewing process. When the abnormality of the seam SE is detected, the output data indicating that the abnormality of the seam SE is detected is output from the output device 10, and thus, at the time when the abnormality of the seam SE is detected, the operator can perform the sewing again using the sewing machine 1 including the seam inspection device 7 that has detected the abnormality. Therefore, deterioration in productivity of the clothes is suppressed.

In addition, the processing device 9 includes the image acquisition unit 91 that acquires the image of the sewing object S from the imaging device 8, the image processing unit 92 that performs the image processing on the image acquired by the image acquisition unit 91 and calculates the detected feature amount of the seam SE, the reference feature amount storage unit 93 that stores the reference feature amount of the seam SE, and the determination unit 93 that determines the pattern of abnormality of the seam SE by collating the detected feature amount with the reference feature amount. Accordingly, the seam inspection device 7 can detect not only the presence and absence of abnormality of the seam S but also the pattern of the occurring abnormality of the seam SE.

In addition, the imaging device 8 shoots the sewing object S from the inclination direction with respect to the normal line of the upper surface of the throat plate 5. Accordingly, in the image acquired by the imaging device 8, the contrast between the sewing object S and the sewing thread ST can be increased. The processing device 9 can calculate the position and the shape of the seams SE with high accuracy based on the image acquired by the imaging device 8.

In addition, the imaging device 8 is a rolling shutter camera. Since the rolling shutter camera is inexpensive, the cost of the seam inspection device 7 is reduced. In addition, by installing the imaging device 8 such that the line direction of the image sensor 8S and the moving direction of the sewing object S are parallel to each other, the seam inspection device 7 can acquire the image of the seam SE in which the occurrence of the rolling shutter phenomenon is suppressed.

Further, in a case where the imaging device 8 acquires the image of the sewing object S which is being moved and the image of the sewing object S which is being stopped, the processing device 9 determines whether or not the image is an image of the sewing object S which is being stopped based on the weave TX of the sewing object S, and detects the abnormality of the seam SE based on the image acquired during the stop. Accordingly, the seam inspection device 7 can perform the detection of the abnormality of the seam SE with high accuracy by using an image that is not influenced by the rolling shutter phenomenon.

In addition, in the above-described embodiment, the pattern of abnormality of the seam SE is an example, and is not limited to the first pattern to the fourth pattern described in the embodiment above. Since the reference feature amount of the seam SE is derived in advance and stored in the reference feature amount storage unit 95, the seam inspection device 7 can detect a pattern of abnormality different from the abnormality of the first pattern to the fourth pattern.

What is claimed is:

1. A seam inspection device comprising:
a camera that shoots a sewing object supported by a throat plate of a sewing machine and having seams formed therein; and
a computer including a memory that stores instructions, and a central processing unit configured to execute the instructions to perform a method including:
acquiring an image of the sewing object from the camera that shoots the sewing object;
performing image processing on the acquired image;
calculating a detected feature amount of the seam, wherein the detected feature amount includes an area defined on a surface of the sewing object by the seams;
storing a reference feature amount of the seam in a reference feature amount storage unit, wherein the reference feature amount includes an abnormal area greater than a normal area defined on the surface of the sewing object by the seams; and
detecting an abnormality of the seams based on the acquired image of the sewing object by determining whether there is a pattern of abnormality of the seam by collating the detected feature amount with the stored reference feature amount, wherein determining whether there is the pattern of abnormality of the at least one seam includes determining whether the abnormality is a third pattern in which a sewing thread becomes slack on the surface of the sewing object.

2. The seam inspection device according to claim 1, wherein the detected feature amount includes a length of the seam, wherein the reference feature amount includes an abnormal length longer than a normal length of the seam, and wherein determining whether there is the pattern of abnormality of the at least one seam includes determining whether the abnormality is a first pattern in which the length of at least one seam increases.

3. The seam inspection device according to claim 1, wherein the detected feature amount includes a width of the seam, wherein the reference feature amount includes an abnormal width wider than a normal width of the seam, and wherein determining whether there is the pattern of abnormality of the at least one seam includes determining whether the abnormality is a second pattern in which the width of at least a part of the seams increases.

4. The seam inspection device according to claim 1, wherein the detected feature amount includes a length of the seam, wherein the reference feature amount includes a normal length of the seam, and wherein determining whether there is the pattern of abnormality of the at least one seam includes determining whether the abnormality is a fourth pattern in which the length of the seam changes.

5. The seam inspection device according to claim 1, wherein the camera shoots the sewing object from an inclination direction with respect to a normal line of an upper surface of the throat plate.

6. The seam inspection device according to claim 1, wherein the camera includes an optical system and a rolling shutter type image sensor, the rolling shutter type image sensor includes a plurality of lines which respectively have a plurality of light receiving elements disposed in a line direction and are disposed in a scan direction orthogonal to the line direction, wherein the sewing machine moves the sewing object in a moving direction and forms the seam, and wherein the camera is installed such that the line direction of the image sensor and the moving direction of the sewing object are parallel to each other.

7. The seam inspection device according to claim 1, wherein the sewing machine forms the seam while repeatedly moving and stopping the sewing object, and wherein the central processing unit is further configured to execute the instructions to perform the method including:

determining whether the acquired image is an image acquired during the stop of the sewing object based on a weave of the sewing object, wherein detecting the abnormality of the seam is based on the acquired image acquired during the stop.

* * * * *